United States Patent [19]
Ash

[11] Patent Number: 5,364,928
[45] Date of Patent: Nov. 15, 1994

[54] PROCESS FOR PREPARING ARYLENE SULFIDE POLYMERS

[75] Inventor: Carlton E. Ash, Bartlesville, Okla.

[73] Assignee: Phillips Petroleum Company, Bartlesville, Okla.

[21] Appl. No.: 62,084

[22] Filed: May 14, 1993

Related U.S. Application Data

[62] Division of Ser. No. 699,118, May 13, 1991, Pat. No. 5,239,050.

[51] Int. Cl.$^5$ ............................................. C08G 75/16
[52] U.S. Cl. ................................... 528/373; 528/374; 528/381; 528/387; 528/388; 528/390
[58] Field of Search ............... 528/373, 374, 381, 387, 528/388, 390

[56] References Cited

U.S. PATENT DOCUMENTS

| | | |
|---|---|---|
| 3,800,845 | 4/1974 | Scoggin . |
| 3,919,177 | 11/1975 | Campbell . |
| 4,025,496 | 5/1977 | Anderson et al. . |
| 4,415,729 | 11/1983 | Scoggins et al. ............... 528/388 |
| 4,645,826 | 2/1987 | Iizuka et al. ............... 528/388 |
| 4,748,231 | 5/1988 | Nesheiwat ............... 528/486 |

FOREIGN PATENT DOCUMENTS 320142  6/1989  European Pat. Off. .

Primary Examiner—John Kight, III
Assistant Examiner—Shelly A. Dodson
Attorney, Agent, or Firm—Beverly M. Dollar

[57] ABSTRACT

A process for preparing high molecular weight arylene sulfide polymers by dehydrating an aqueous mixture of a sulfur source and a cyclic organic amide to form a dehydrated mixture, contacting the dehydrated mixture with a dihaloaromatic compound to produce a polymerization mixture, polymerizing the polymerization mixture and recovering the arylene sulfide polymer wherein an aqueous alkali metal carboxylate mixture is added to the polymerization mixture after the conversion of the dihaloaromatic compound is about 40 percent to about 30 minutes prior to entering into termination of the polymerization. In another embodiment, a process for preparing high molecular weight arylene sulfide polymers by contacting an essentially anhydrous sulfur source, a cyclic organic amide, and a dihaloaromatic compound to form a polymerization mixture, polymerizing the polymerization mixture and recovering the arylene sulfide polymer wherein an aqueous alkali metal carboxylate mixture is added to the polymerization mixture after the conversion of the dihaloaromatic compound is about 40 percent to about 30 minutes prior to entering into termination of the polymerization.

7 Claims, 1 Drawing Sheet

PROCESS FOR PREPARING ARYLENE SULFIDE POLYMERS

CROSS REFERENCE TO RELATED APPLICATION

This application is a division of prior application, Ser. No. 07/699,118, filed May 13, 1991, U.S. Pat. No. 5,239,050.

BACKGROUND OF THE INVENTION

This invention relates to the production of arylene sulfide polymers. In one aspect, this invention relates to the production of high molecular weight arylene sulfide polymers. In another aspect, this invention relates to the production of high molecular weight phenylene sulfide polymers.

High molecular weight arylene sulfide polymers are known in the art, and U.S. Pat. No. 3,919,177 is exemplary of a process for making these polymers. Although this patent represents a significant and valuable advance in the art, there is a need for a simplified process for decreasing the total polymerization cycle time, thereby permitting increased polymerization reactor productivity.

SUMMARY OF THE INVENTION

It is an object of the invention to provide a process for producing high molecular weight arylene sulfide polymers having a shorter polymerization cycle time.

In one embodiment, a simplified process for achieving a shorter polymerization cycle time by reducing the dehydration cycle time in the polymerization of arylene sulfide polymers has now been discovered. The discovery that an aqueous mixture of alkali metal carboxylate can be added after the polymerization has commenced in order to reduce dehydration time while still producing an arylene sulfide polymer of comparable molecular weight was completely unexpected even though alkali metal carboxylates are known in the art to function as polymerization modifiers for increasing polymer molecular weight when added prior to commencement of polymerization. Furthermore, a simplified process for achieving a shorter polymerization time in the polymerization of arylene sulfide polymers in situations where a late addition of polymerization modifier is desirable, e.g. the presence of polymerization modifier during dehydration causes foaming and results in increased dehydration cycle times, has now been discovered. The fact that an aqueous alkali metal carboxylate mixture can be added after the polymerization has commenced while still producing an arylene sulfide polymer of comparable molecular weight is also unexpected.

According to the invention, a process for preparing arylene sulfide polymers is provided which comprises dehydrating an aqueous mixture comprising at least one sulfur source and at least one cyclic organic amide thereby forming a dehydrated mixture, contacting at least one dihaloaromatic compound with said dehydrated mixture to produce a polymerization mixture, subjecting the polymerization mixture to polymerization conditions of temperature and time sufficient to form the arylene sulfide polymer, and recovering the arylene sulfide polymer, wherein an aqueous alkali metal carboxylate mixture is added to the polymerization mixture after the conversion of the dihaloaromatic compound is about 40 percent to about 30 minutes prior to entering into termination of polymerization.

Further according to the invention, a process for preparing arylene sulfide polymers is provided which comprises contacting at least one essentially anhydrous sulfur source, at least one cyclic organic amide, and at least one dihaloaromatic compound to form a polymerization mixture, subjecting the polymerization mixture to polymerization conditions of temperature and time sufficient to form the arylene sulfide polymer, and recovering the arylene sulfide polymer, wherein an aqueous alkali metal carboxylate mixture is added to the polymerization mixture after the conversion of the dihaloaromatic compound is about 40 percent to about 30 minutes prior to entering into termination of polymerization.

DETAILED DESCRIPTION OF THE INVENTION

Figure 1:
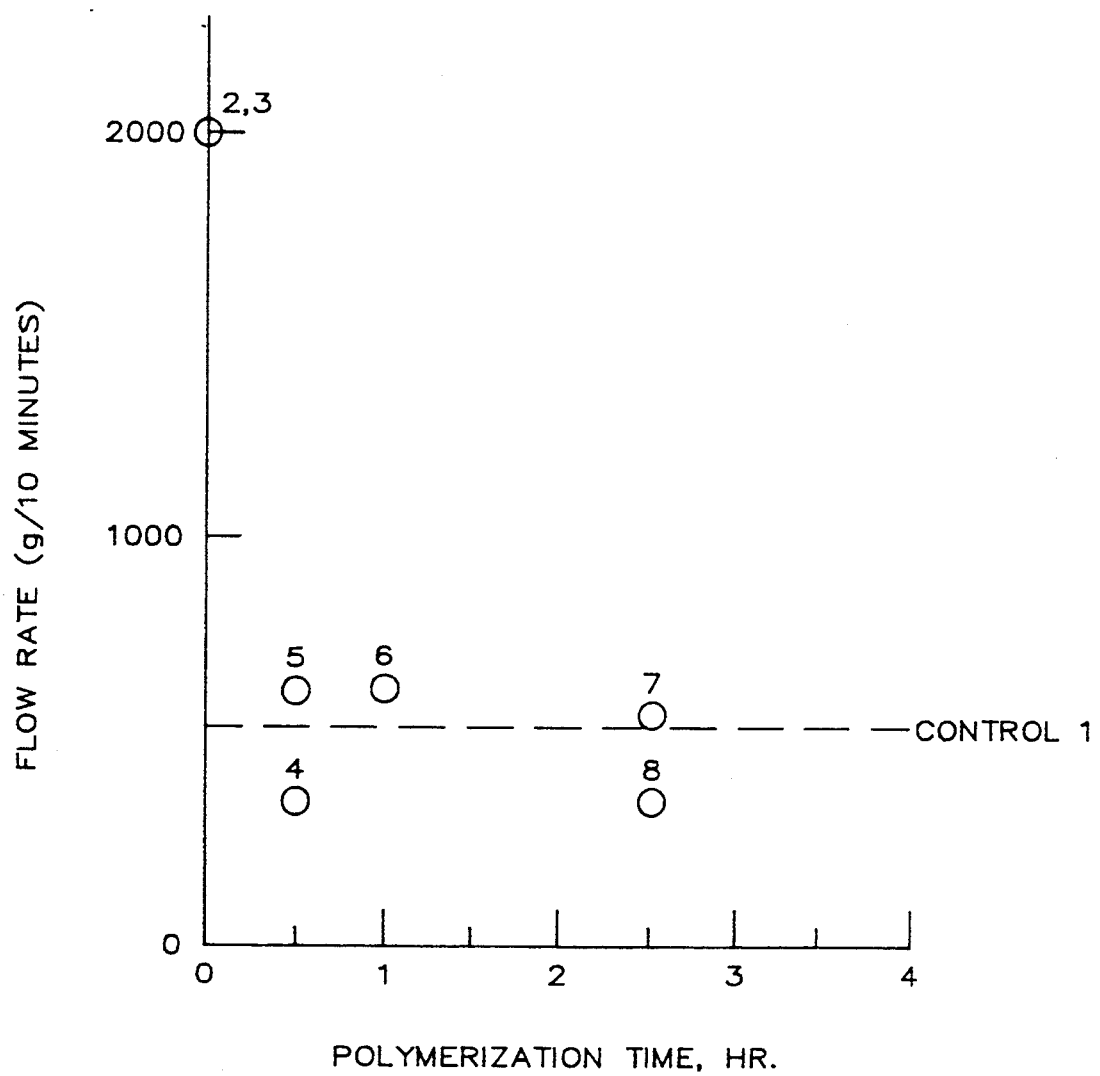
FIG. 1 is a plot demonstrating the effect of addition time of aqueous sodium acetate on poly(phenylene sulfide) molecular weight for polymerizations described in Example I.

This invention relates to a process for preparing high molecular weight arylene sulfide polymers comprising the steps of: (a) dehydrating an aqueous mixture comprising at least one sulfur source and at least one cyclic organic amide thereby forming a dehydrated mixture, (b) contacting at least one dihaloaromatic compound with the dehydrated mixture to produce a polymerization mixture, (c) subjecting the polymerization mixture to polymerization conditions of temperature and time sufficient to form the arylene sulfide polymer, and (d) recovering the arylene sulfide polymer, wherein an aqueous alkali metal carboxylate mixture is added to the polymerization mixture after the conversion of the dihaloaromatic compound is about 40 percent to about 30 minutes prior to entering into termination of polymerization.

In another embodiment, this invention relates to a process for preparing high molecular weight arylene sulfide polymers comprising the steps of: (a) contacting at least one essentially anhydrous sulfur source, at least one cyclic organic amide, and at least one dihaloaromatic compound to form a polymerization mixture, (b) subjecting the polymerization mixture to polymerization conditions of temperature and time sufficient to form the arylene sulfide polymer, and (c) recovering the arylene sulfide polymer, wherein an aqueous alkali metal carboxylate mixture is added to the polymerization mixture after the conversion of the dihaloaromatic compound is about 40 percent to about 30 minutes prior to entering into termination of polymerization.

The arylene sulfide polymers made according to this invention are readily recoverable and well suited for use in applications where such arylene sulfide polymers are desired, e.g. film, fiber, molding compounds and composites. The term "arylene sulfide polymer" is defined by the formula

wherein —Ar—S— is the repeating unit, i is the number of repeating units in the polymer molecule, and Ar is selected from the group consisting of

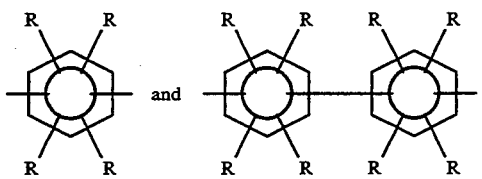

wherein R is selected from the consisting of hydrogen and alkyl radicals having 1 to about 4 carbon atoms, the total number of carbon atoms in all of the R groups in the repeat unit being 0 to about 12.

The alkali metal carboxylate which is utilized according to the process of the invention can be represented by the formula $R'(CO_2M)_z$ where $R'$ is a hydrocarbyl radical selected from alkyl, cycloalkyl, and aryl and combinations thereof such as alkaryl, aralkyl, and the like, the number of carbon atoms in said $R'$ being within the range of 1 to about 20, M is an alkali metal selected from lithium, sodium, potassium, rubidium, and cesium, and z is an integer from 1 to 3.

Alkali metal carboxylate mixture is defined herein as a solution or a slurry of alkali metal carboxylate in water. The alkali metal carboxylate mixture is added to the polymerization mixture after the conversion of the dihaloaromatic compound is about 40 percent to about 30 minutes prior to entering into termination of polymerization, preferably after the conversion of the dihaloaromatic compound is about 45 percent to about 60 minutes prior to entering into termination of polymerization, and most preferably after the conversion of the dihaloaromatic compound is about 65 percent to about 60 minutes prior to entering into termination of polymerization. As used herein, conversion of the dihaloaromatic compound is defined as follows:

$$\text{conversion} = \frac{\text{Dihaloaromatic charge} - \text{Residual Dihaloaromatic}}{\text{Dihaloaromatic charge} - \text{Excess Dihaloaromatic}} \times 100$$

wherein Excess Dihaloaromatic is the excess of dihaloaromatic compound relative to the sulfur source when the dihaloaromatic compound is charged and Residual Dihaloaromatic is the amount of dihaloaromatic compound remaining when the conversion is determined. Excess Dihaloaromatic will equal zero in the above equation when the moles of dihaloaromatic compound is equal to or less than the moles of sulfur source. As used herein, commencement of polymerization is defined as that point at which the polymerization mixture is first subjected to polymerization conditions sufficient to initiate polymerization. As used herein, entering into termination of polymerization is defined as that point at which an affirmative step is taken to effect a removal of the conditions necessary for polymerization to effectively continue, e.g. by beginning the recovery of the arylene sulfide polymer from the polymerization mixture. It must be recognized that entering into termination of the polymerization does not necessarily result in the immediate termination of the polymerization of arylene sulfide polymer. Rather, for economic reasons, polymer recovery is generally begun at a time when polymerization is substantially completed, i.e. the increase in polymer molecular weight which would result from further polymerization is not significant enough to warrant the additional polymerization time.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, sodium adipate, sodium terephthalate and the like and mixtures thereof. The presently preferred alkali metal carboxylate is sodium acetate because of its effectiveness and commercial availability.

The amount of alkali metal carboxylate employed according to the invention can be expressed in terms of molar ratio based on the sulfur source compound employed. Broadly, the molar ratio of alkali metal carboxylate to sulfur source compound will be from about 0.002:1 to about 4:1, preferably about 0.1:1 to about 2:1.

The dihaloaromatic compounds which are employed according to the invention are compounds having 6 to about 22 carbon atoms per molecule. The halogen substituent on the dihaloaromatic compound can be selected from the group consisting of chlorine, bromine and iodine. Preferably, the dihaloaromatic compound will be dihalo-substituted benzene and more preferably dichloro-substituted benzene. Particularly good results are expected when the dihaloaromatic compound is selected from the group consisting of p-dichlorobenzene and mixtures of p-dichlorobenzene with a total of 0 to about 10 mole percent of at least one of m-dichlorobenzene, o-dichlorobenzene and alkyl-substituted dichlorobenzene having the formula

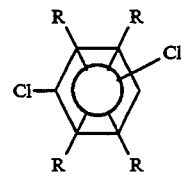

wherein R is as defined here and at least one R is not hydrogen.

Examples of some suitable dihaloaromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetra-methyl-3, 6-dichlorobenzene, 1,2,4,5-tetrabutyl-3,6-dichlorobenzene, 1-ethyl-3-butyl-2,5-dichlorobenzene, 1-ethyl-2,5-diiodobenzene, 1-butyl-2,5-dichlorobenzene, 1-butyl-4-ethyl-2,5-dibromobenzene, o-dichlorobenzene, m-dichlorobenzene and the like, and mixtures of any two or more thereof. The presently preferred dihaloaromatic compound is p-dichlorobenzene because of its effectiveness and commercial availability.

The cyclic organic amide used in the process of the invention should be substantially liquid at the reaction temperatures and pressures employed. The cyclic organic amides can have 5 to about 12 carbon atoms per molecule. Examples of some suitable cyclic organic amides include N,N'-ethylene dipyrrolidone, N-methyl-2-pyrrolidone, pyrrolidone, caprolactam, N-ethyl caprolactam, N-methyl caprolactam and mixtures thereof. The presently preferred cyclic organic amide is N-methyl-2-pyrrolidone because of its effectiveness and commercial availability. The amount of cyclic organic amide employed according to the process of the invention can be expressed in terms of a molar ratio of cyclic organic amide to sulfur source compounds. Broadly, the molar ratio of cyclic organic amide to sulfur source compound will be about 1.5:1 to about 25:1, preferably about 2:1 to about 8:1.

In accordance with the embodiment of the invention where a dehydration step is required, suitable sulfur sources which can be employed in the production of the arylene sulfur polymers include alkali metal sulfides, alkali metal bisulfides, thiolactams, and hydrogen sulfide. In accordance with the embodiment of the invention where an essentially anhydrous sulfur source is required, suitable sulfur sources which can be employed in the production of arylene sulfide polymers include, but are not limited to, alkali metal sulfide, alkali metal bisulfide and thiolactam. As used herein, the term essentially anhydrous sulfur source is defined as a sulfur source containing no water or such a small amount of water as to have substantially no detrimental effect on the polymerization. Further according to the invention, the alkali metal sulfides can be employed with good results in the absence of any added alkali metal hydroxide whereas the other suitable sulfur sources are preferably employed in the process of the invention in the presence of an added base, such as an alkali metal hydroxide. For the alkali metal bisulfides and thiolactams, the amount of added alkali metal hydroxide will generally be in the range of from about 0.3:1 to about 4:1, preferably about 0.4:1 to about 2:1 moles per mole of alkali metal bisulfides or thiolactams. When an essentially anhydrous alkali metal bisulfide or thiolactam is used, the alkali metal hydroxide should also be essentially anhydrous wherein essentially anhydrous alkali metal hydroxide is defined herein as containing no water or such a small amount of water as to have substantially no detrimental effect on the polymerization. When hydrogen sulfide is employed as the sulfur source, the amount of added alkali metal hydroxide is generally within the range of about 1.3:1 to about 5:1, preferably about 1.4:1 to about 3:1 moles per mole of hydrogen sulfide employed.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can be utilized in the process of the invention as an aqueous solution or in anhydrous form. For example, an aqueous solution of sodium hydroxide having about 50 weight percent sodium hydroxide is convenient to use.

Alkali metal bisulfides that can be employed according to the invention include sodium bisulfide, lithium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

Thiolactams that can be employed according to the invention include 2-pyrrolidinethione, N-methyl-2-pyrrolidinethione, N-ethyl-2-pyrrolidinethione, N-cyclohexyl-2-pyrrolidinethione, and the like, and mixtures thereof. N-methyl-2-pyrrolidinethione is preferred because of its effectiveness. The thiolactam can be used in anhydrous form or as an aqueous mixture.

Alkali metal sulfides which can be employed in the process of the invention include lithium sulfide, sodium sulfide, potassium sulfide, rubidium sulfide, cesium sulfide and mixtures thereof. The alkali metal sulfide can be used in anhydrous form, as a hydrate, or as an aqueous mixture. Sodium sulfide is preferred because of ready availability and good results obtained therewith.

While the ratio of reactants for the preparation of arylene sulfide polymers according to the invention can vary considerably, the ratio of moles of dihaloaromatic compound to atoms of divalent sulfur in the sulfur source should be within the range of about 0.8:1 to about 2:1, preferably about 0.95:1 to about 1.3:1.

In a further embodiment of the invention, polyhaloaromatic compounds can be employed in the process of the invention as a component in the polymerization mixture. The amount of polyhaloaromatic compound which may be employed can be conveniently expressed in terms of a molar ratio based on the sulfur source compound employed. Broadly, the molar ratio of polyhaloaromatic compound to sulfur source will be about 0.001:1 to about 0.02:1, preferably about 0.002:1 to about 0.01:1, and most preferably about 0.004:1 to about 0.008:1.

Polyhaloaromatic compounds that can be employed in the process of the invention can be represented by the formula

wherein X is a halogen selected from the group consisting of fluorine, chlorine, bromine and iodine, a is 3 or 4 and a+b is 6. When a is 3, each Z is preferably hydrogen. When a is 4, Z can be hydrogen, or any of a variety of substituents including, but not limited to, alkyl radicals having 1 to about 4 carbon atoms, —$NH_2$ and —OR" wherein R" is an alkyl radical having 1 to about 4 carbon atoms.

Examples of suitable polyhaloaromatic compounds that can be employed in the process of the invention include 1,2,3-trichlorobenzene, 1,2,4-trichlorobenzene, 1,3,5-trichlorobenzene, 1,2,3-trifluorobenzene, 1,2,4-trifluorobenzene, 1,3,5-trifluorobenzene, 1,2,3,4-tetrachlorobenzene, 1,2,4,5tetrachlorobenzene, 1,2,3,5- tetrachlorobenzene, 1,2,3,4-tetrafluorobenzene, 1,2,4,5-tetrafluorobenzene, 1,2,3,5-tetrafluorobenzene, 1,3-dichloro-4-fluorobenzene, 1,3-dichloro-2-fluorobenzene, 2,3,4,5-tetrachloroaniline, 2,3,5,6-tetrachloroaniline, 2,3,4,5-tetrachlorotoluene, 2,3,4,6-tetrachlorotoluene, 2,3,5,6-tetrachlorotoluene, 1-methoxy-2,3,5,6-tetrachlorobenzene, 2-methoxy-1,3,4,5-tetrachlorobenzene, and the like, and mixtures of any two or more thereof. The presently preferred polyhaloaromatic compound is 1,2,4-trichlorobenzene because of its effectiveness, economics and commercial availability.

Suitable polymerization conditions include a reaction temperature which can vary over a wide range but will generally be within the range of about 200° C. to about 450° C., preferably from about 210° C. to about 350° C. The reaction time will be within the range of about 1 hour to about 24 hours, preferably about 2 hours to about 9 hours, and most preferably about 2.5 hours to about 6 hours. The pressure need be only sufficient to maintain the dihaloaromatic compound and the cyclic organic amide substantially in the liquid phase, and to substantially retain the sulfur source therein.

Although various known methods can be employed for the recovery of the arylene sulfide polymers made according to the invention, it is preferred to employ a method, such as the one described in U.S. Pat. No. 3,800,845, wherein the heated polymerization mixture is subjected to an isothermal evaporation reducing the pressure on the polymerization mixture from reaction pressure sufficiently to evaporate essentially all of the water and approximately one-third of the cyclic organic amide and then removing the concentrated polymerization mixture to another vessel flashing the mixture adiabatically to about atmospheric pressure to remove essentially all the cyclic organic amide from the arylene sulfide polymer. The flashed reaction mixture residue can be slurried with a liquid diluent such as water in which the alkali metal halides and other impurities are soluble. The liquid diluent is removed with dissolved impurities such as by filtration leaving a particular arylene sulfide polymer. This washing process can be repeated until the desired level of arylene sulfide polymer purity is attained. Another known method that can be employed is the "water quench" process described in U.S. Pat. No. 4,415,729, wherein the polymerization mixture is contacted at a temperature above that at which the arylene sulfide polymer is soluble in the polymerization mixture with a sufficient amount of a separation agent that is soluble in the cyclic organic amide and is a non-solvent for the arylene sulfide polymer, e.g. water, to cause or enhance a phase separation. Subsequent cooling of the quenched, phase-separated mixture produces a slurry of particulate arylene sulfide polymer in the cyclic organic amide which can be filtered to recover the particulate arylene sulfide polymer. The separated polymer can be washed as described above.

The arylene sulfide polymers produced by the process of the invention can be blended with fillers, fibers, pigments, extenders, other polymers and the like. The arylene sulfide polymers can be cured to provide cured products having high thermal stability and good chemical resistance, wherein curing is defined as a distinct process step after polymer drying comprising a thermal treatment on the polymer in the presence of an oxygen-containing atmosphere. The preferred oxygen-containing atmosphere is air. The arylene sulfide polymers of the invention are useful in the production of film, fibers, molded objects and composites.

Examples

In the following examples, the polymer melt flow rates were determined by the method of ASTM D 1238-86, Condition 315/5.0, modified to use a five minute preheat, the value of flow rate being expressed as g/10 minutes. The polymer extrusion rates, also expressed as g/10 minutes, were determined by the method of ASTM D 1238-86, Condition 315/0.345, modified to use a five minute preheat. The orifice for extrusion rate had a 2.096±0.005 mm diameter and a 31.75±0.05 mm length.

Example I

Run 1 was a control run in which the sodium acetate polymerization modifier was added before the dehydration step.

A one-liter, stainless steel reactor was charged with 1.0 g-mol sodium hydrosulfide (NaSH) as an aqueous mixture containing 59.42 weight percent NaSH, 1.0 g-mol sodium hydroxide (NaOH), 0.3 g-mol sodium acetate (NaOAc), and 2.5 g-mol N-methyl-2-pyrrolidone (NMP). After the reactor had been purged with nitrogen, the reactor stirrer was started and the reactor contents were heated rapidly for dehydration. When the temperature reached 145° C., the dehydration vent line was opened and dehydration was carried out.

After the dehydration had been terminated, 1.01 g-mol p-dichlorobenzene (DCB) and 1.0 g-mol NMP were charged to the reactor. Polymerization was carried out by heating the mixture to 235° C. and holding for one hour followed by heating to 265° C. and holding for three hours. After the reactor had cooled, the contents were removed, filtered, and washed with hot, deionized water. The polymer was dried in a vacuum at 125° C. and the dried product had a flow rate of 525 g/10 min.

Control runs 2 and 3 were carried out in a procedure similar to that in run 1 except without the addition of NaOAc before dehydration and with the addition of an aqueous sodium acetate modifier immediately after DCB was charged to the dehydrated mixture. In run 2, 0.3 g-mol sodium acetate and 1.50 g-mol water were added. In run 3, 0.3 g-mol sodium acetate and 1.55 g-mol water were used. The polymer products of runs 2 and 3 had extrusion rates of 22 and 18 g/10 min.

Five additional runs were carried out according to the process of the present invention wherein the aqueous sodium acetate modifier was added to the polymerization mixture at various times during the PPS polymerization. In each run, 0.3 g-mol NaOAc in either 1.55 or 1.77 g-mol water was added after 0.5 or 1 hour of the 235° C. hold or after 1 hour of the 265° C. hold. In run 7, the 265° C. hold was done for a total of 2.5 hours instead of the 3 hours of the other runs.

The results of these runs are summarized in Table I. Invention runs 4 through 8 gave polymer flow rate values similar to that of control run one. In sharp contrast with the invention runs, the addition of aqueous NaOAc right after the DCB charge (runs 2 and 3) gave much lower molecular weight polymers. It is surprising that the addition of the aqueous polymerization modifier during the polymerization reaction produces high molecular weight PPS similar to reactions where the modifier is present from the start of the dehydration.

TABLE I

| | PPS Polymerization | | | |
|---|---|---|---|---|
| | Water/NaOAc Addition | | Flow Rate, | Extrusion Rate, |
| Run | g-mol H$_2$O | Addition Point[b] | g/10 min | g/10 min |
| 1[c] | 0 | —[a] | 525 | — |
| 2[c] | 1.50 | After DCB Charge | — | 22 |
| 3[c] | 1.55 | After DCB Charge | — | 18 |
| 4[d] | 1.55 | 0.5 hr at 235° C | 354 | 4 |
| 5[d] | 1.55 | 0.5 hr at 235° C | 619 | — |
| 6[d] | 1.77 | 1.0 hr at 235° C | 619 | — |
| 7[d] | 1.55 | 1.0 hr at 265° C | 589 | — |

TABLE I-continued

| | PPS Polymerization | | | |
|---|---|---|---|---|
| | Water/NaOAc Addition | | Flow Rate, | Extrusion Rate, |
| Run | g-mol H₂O | Addition Point[b] | g/10 min | g/10 min |
| 8[d] | 1.55 | 1.0 hr at 265° C | 367 | — |

[a]Sodium acetate added before dehydration
[b]Addition was made after the time period indicated
[c]Control run
[d]Invention run To more clearly illustrate the effects of the present invention, the results from Table I are plotted in FIG. 1 with the polymer flow rate values shown as a function of the modifier addition time during the polymerization. Since the melt viscosity values from runs 2 and 3 are in extrusion rate units, the flow rate values of these runs are plotted as approximate corresponding melt flows of 2000 g/10 min. Control run one is shown as a dotted line at about 525 g/10 min. The polymerization time is shown as the total time from the DCB charge including one hour at 235° C., 0.5 hours for heating to 265° C., and the number of hours at 265° C.

Example II

This example presents additional PPS polymerization runs to further demonstrate the addition of aqueous polymerization modifier to the polymerization mixture. Run 9 is a control run made with the NaOAc added before the dehydration step.

In control run 9, a one-liter, stainless steel reactor was charged with 1.0 g-mol NaSH as an aqueous mixture containing 59.085 weight percent NaSH, 1.01 g-mol NaOH, 0.3 g-mol NaOAc, and 2.5 g-mol NMP. After the reactor had been purged with nitrogen, the reactor stirrer was started and the mixture slowly heated for dehydration. When the temperature reached 154° C., the dehydration vent line was opened and dehydration was carried out.

After the dehydration had been terminated, 1.01 g-mol DCB and 1.0 g-mol NMP were charged to the reactor. Polymerization and polymer recovery were carried out as described in run 1 of Example 1 to produce a polymer with a flow rate of 207 g/10 min.

Invention runs 10, 11, and 12 were carried out in a manner similar to that described for run 9 except that NaOAc was not added to the reactor before dehydration, but was added as an aqueous solution during the polymerization. The polymerization conditions in run 10 were modified slightly to a longer time at lower temperatures.

Run 13 is a control run made with the same procedure as in run 11 except that only water and no NaOAc was added to the polymerization mixture. The extrusion rate of the polymer from run 13 was 17 g/10 min., showing that the added water does not produce the enhanced molecular weights of the invention runs. Run 14 is another control run carried out in a manner similar to that in run 9, except that no water and no NaOAc were added. The low molecular weight (extrusion rate of 36 g/0 min.) shows that the presence of the polymerization modifier is required to obtain the high molecular weight of the invention runs.

These results are summarized in Table II with the variations in polymerization cycle, water level added, and NaOAc added. Invention run 10 is similar to control run 9. Runs 11 and 12 are a little higher in melt flow than run 10, suggesting that adding the polymerization modifier one hour from the termination of the polymerization is slightly less effective than adding the modifier earlier in the polymerization cycle. The lower molecular weights observed in runs 13 and 14 show that the modifier is required for molecular weight enhancements.

TABLE II

| | | PPS Polymerization Water and Sodium Acetate Addition | | | | |
|---|---|---|---|---|---|---|
| | | Added | | | Flow | Extrusion |
| Run | Polymerization Cycle | H₂O g-mol | NaOAc g-mol | Addition Point[b] | Rate, g/10 min | Rate, g/10 min |
| 9[c] | 1 hr 235<br>3 hr 265 | 0 | 0.30 | —[a] | 207 | — |
| 10[d] | 1 hr 220<br>1.5 hr 230<br>2 hr 265 | 1.60 | 0.30 | 1.5 hr at 230° C. | 293 | — |
| 11[d] | 1 hr 235<br>2 hr 265<br>1 hr 265 | 1.60 | 0.27 | 2 hr at 265° C. | 565 | |
| 12[d] | 1 hr 235<br>2 hr 265<br>1 hr 265 | 1.60 | 0.30 | 2 hr at 265° C. | 625 | |
| 13[c] | 1 hr 235<br>2 hr 265<br>1 hr 265 | 1.60 | 0 | 2 hr at 265° C. | — | 17 |
| 14[c] | 1 hr 235<br>3 hr 265 | 0 | 0 | — | — | 36 |

[a]Water and sodium acetate added before dehydration step.
[b]Addition was made after the time period indicated
[c]Control run
[d]Invention run

Example III

This example presents several control runs that demonstrate that the addition of water to these PPS polymerizations do not produce a significant increase in PPS molecular weight in the absence of a polymerization modifier. The polymerization cycle, amount of water added, and the point of water addition were varied.

Run 15 was carried out in a manner similar to that described in run 1 of Example 1 except that no NaOAc was used and the 265° C. polymerization hold time was two hours. Runs 16 through 19 were similar to run 15 in polymerization cycle, but water was added during the 235° C. hold time. Runs 20 and 21 used larger quantities of water and longer polymerization times.

The polymerization results are shown in Table III. These results show that the addition of water using any of several water levels, addition times, and polymerization cycles did not result in any significant increase in the PPS molecular weight compared with the control run 15.

TABLE III

Addition of Water To PPS Polymerizations[a]

| Run | Polymerization Cycle, time at °C. | Water Addition g-mol | Water Addition Point[b] | Extrusion Rate, g/10 min |
|---|---|---|---|---|
| 15 | 1 hr 235 / 2 hr 265 | 0 | — | 22 |
| 16 | 1 hr 235 / 2 hr 265 | 1.55 | 0.5 hr at 235° C. | 89 |
| 17 | 1 hr 235 / 2 hr 265 | 1.55 | 1 hr at 235° C. | 21 |
| 18 | 1 hr 235 / 2 hr 265 | 1.55 | 1 hr at 235° C. | 16 |
| 19 | 1 hr 235 / 2 hr 265 | 1.55 | 1 hr at 235° C. | 12 |
| 20 | 1 hr 235 / 2 hr 265 / 6 hr 265 | 4.0 | 2 hr at 265° C. | 16 |
| 21 | 0.5 hr 235 / 1 hr 265 / 6 hr 265 | 4.0 | 1 hr at 265° C. | 22 |

[a]No sodium acetate added.
[b]Addition was made after the time period indicated.

Example IV

Several more control runs were carried out to demonstrate that the PPS molecular weight is not significantly enhanced when a polymerization modifier is added before dehydration and water is added during the polymerization cycle.

Run 1 from Example 1 is the control run for this series of polymerizations. Runs 22 through 30 were done in a manner similar to that of run 1 except for the addition of water at various points in the polymerization cycle. Run 30 also differed by using a polymerization cycle of 0.5 hour at 235° C., 1.0 hour at 265° C. and 6.0 hours at 265° C.

The results of these runs are summarized in Table IV. The variations in quantities of water and points of water addition resulted in PPS which did not have a significantly higher molecular weight than that of the control (Runs 27–29 v. Run 1) or which had a lower molecular weight than that of the control (Runs 22–26 and 30 v. Run 1).

TABLE IV

Addition of Water To PPS Polymerization[a]

| Run | Water Addition g-mol | Water Addition Point[b] | Flow Rate, g/10 min | Extrusion Rate, g/10 min |
|---|---|---|---|---|
| 1 | 0 | — | 525 | — |
| 22 | 1.50 | 0.5 hr at 235° C. | — | 37 |
| 23 | 1.55 | 0.5 hr at 235° C. | 1359 | 15 |
| 24 | 1.55 | 0.5 hr at 235° C. | — | 14 |
| 25 | 1.55 | 0.5 hr at 235° C. | 740 | 9 |
| 26 | 0.25 | 1 hr at 265° C. | 1106 | — |
| 27 | 1.00 | 1 hr at 265° C. | 527 | — |
| 28 | 1.55 | 1 hr at 265° C. | 312 | — |
| 29 | 1.55 | 1 hr at 265° C. | 406 | — |
| 30 | 4.0 | 1 hr at 265° C. | 961 | — |

[a]Sodium acetate (0.30 g-mol) added before dehydration.
[b]Addition was made after the time period indicated.

Example V

Two PPS polymerizations were carried out and then terminated at the point of addition of aqueous carboxylate in invention runs in Example I to determine the DCB conversions after 30 and 60 minutes at 235° C.

In run 31, a one-liter, stirred, stainless steel reactor was charged with 1.0 g-mol NaSH as an aqueous mixture containing 58.805 weight percent NaSH, 1.01 g-mol NaOH, and 2.5 g-mol NMP. The reactor was purged with nitrogen, stirrer started, and the reactor heated for dehydration. When the temperature reached 157° C., the dehydration vent line was opened and dehydration was carried out.

After the dehydration had been terminated, 1.01 g-mol DCB and 1.0 g-mol NMP were charged to the reactor. The mixture was heated to 235° C. and held at 235° C. for 30 minutes. Then the reactor was cooled, opened, and the contents removed. After the reactor had been blended with acetone and filtered, the filtrate was analyzed for DCB content by vapor phase chromatography. The conversion of DCB after 30 minutes at 235° C. was 48 percent.

Run 32 was carried out as described for run 31, except the polymerization mixture was heated at 235° C. for 60 minutes. The DCB conversion after 60 minutes at 235° C. was 71 percent.

That which is claimed is:

1. A process for preparing an arylene sulfide polymer comprising the steps of: (a) contacting at least one essentially anhydrous sulfur source, at least one cyclic organic amide, and at least one dihaloaromatic compound to form a polymerization mixture, (b) subjecting said polymerization mixture to polymerization conditions of temperature and time sufficient to form said arylene sulfide polymer, and (c) recovering said arylene sulfide polymer, wherein an aqueous alkali metal carboxylate mixture is added to said polymerization mixture after the conversion of said dihaloaromatic compound is about 40 percent but prior to recovering said arylene sulfide polymer.

2. A process according to claim 1 wherein said essentially anhydrous sulfur source is selected from the group consisting of alkali metal sulfides, alkali metal bisulfides and thiolactams.

3. A process according to claim 2 wherein said polymerization mixture further comprises an essentially anhydrous alkali metal hydroxide.

4. A process according to claim 3 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

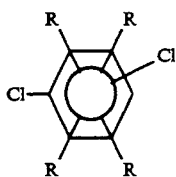

wherein R is hydrogen or an alkyl group of 1 to about 4 carbon atoms and at least one R is not hydrogen.

5. A process according to claim 4 wherein said alkali metal bisulfide comprises sodium bisulfide, said alkali metal hydroxide comprises sodium hydroxide, said dihaloaromatic compound comprises p-dichlorobenzene, and said alkali metal carboxylate comprises sodium acetate.

6. A process according to claim 5 wherein said polymerization mixture further comprises a tri- or tetrahaloaromatic compound.

7. A process according to claim 1 wherein the addition of said alkali metal carboxylate mixture occurs at a time in the range of about 30 minutes after commencement of polymerization up to about 30 minutes prior to beginning step (d).

* * * * *